United States Patent [19]

Mitschke et al.

[11] 4,088,939
[45] May 9, 1978

[54] GUIDING AN UNTRACKED VEHICLE ALONG A PREDETERMINED GUIDE PATH

[75] Inventors: Manfred Mitschke, Wolfenbuttel; Henning Wallentowitz, Vallstedt, both of Germany

[73] Assignee: Robert Bosch GmbH, Stuttgart, Germany

[21] Appl. No.: 671,828

[22] Filed: Mar. 30, 1976

[30] Foreign Application Priority Data

May 15, 1975 Germany .............................. 2521571

[51] Int. Cl.² ............................................. G05B 19/36
[52] U.S. Cl. ....................................... 318/576; 180/98
[58] Field of Search ............... 318/560, 574, 576, 587, 318/588, 581; 180/98

[56] References Cited
U.S. PATENT DOCUMENTS 3,638,751   2/1972   Moll ..................................... 318/587

Primary Examiner—Robert K. Schaefer
Assistant Examiner—L. Pojunas
Attorney, Agent, or Firm—Flynn & Frishauf

[57] ABSTRACT

Three sensing coils are located on a vehicle, staggered longitudinally in known distances from each other along the vehicle. The sensing coils pick up the field of a conductor buried in the surface over which the vehicle is to operate and energized with a-c at an audio frequency. From the three output signals derived from the three coil pairs, the radius of curvature of the guide path is computed and the steering deflection of the steering wheels of the vehicle is controlled by the computed radius of curvature to steer the vehicle along the radius; the computed radius of curvature signal may also be used to control other operating parameters, such as vehicle speed; average coil deviation signals may additionally be introduced into the steering control signal, which operates a steering servo, to additionally compensate for minor deviations of the vehicle from the guide path.

14 Claims, 3 Drawing Figures

GUIDING AN UNTRACKED VEHICLE ALONG A PREDETERMINED GUIDE PATH

CROSS REFERENCE TO RELATED PATENT AND APPLICATION

U.S. Ser. No. 492,523, Maisch et al, now U.S. Pat. No. 3,942,087; U.S. Ser. No. 650,917, filed Jan. 21, 1976, Rubel, now U.S. Pat. No. 3,993,156, both assigned to the assignee of the present application.

The present invention relates to a system and method to guide an untracked vehicle along a guide path, and more particularly to an arrangement and method in which a cable is buried in a support surface, energized by a-c, and the vehicle is supplied with sensing coils which sense the field emanating from the cable and provide a differential output representative of deviation of the coils from the cable.

It has previously been proposed to determine the lateral deviation of a vehicle from a guide cable by securing a pair of sensing coils adjacent the forward end of the vehicle, and another pair of sensing coils adjacent the rear end of the vehicle and then so controlling a steering servo to cut the wheels of the vehicle in such a direction that the lateral of one of the pairs of coils, typically the forward pair from the guide cable, becomes a minimum.

It has previously been proposed (see German Disclosure Document DT-OS No. 1,801,967) to apply the a-c voltages derived from the sensing coil, typically from the coils at the forward end of the vehicle, to two inputs of a differential amplifier. The output of the differential amplifier forms a forward error signal. Likewise, the inputs of the rearwardly located coils are applied to a differential amplifier to generate a rear error signal. The two error signals are combined, with the forward error signal being given a higher weighting in the combined signal to control the steering servo. Since the forward error signal will have a greater effect on steering, the vehicle will tend to return to the center, command position above the guide cable after any deviation therefrom in accordance with a logarithmic function, that is, in accordance with the function of a natural logarithm. It has been found that this guidance system is effective, however, only at small speeds if the guide path is curved, so that the guide cable will likewise follow a sinuous path. At higher speeds, the deviations become substantial an steering is difficult to control.

It is an object of the present invention to ensure guidance of the vehicle along a sinuous or curved path even at higher vehicle speeds without resulting in excessive deviations of the vehicle from the predetermined guide path.

SUBJECT MATTER OF THE PRESENT INVENTION

Briefly, the radius of curvature of the guide path beneath the vehicle is sensed by providing three sensing units, typically three pairs of sensing coils. From the output signals of the three coils, the radius of curvature of the path beneath the vehicle can be computed since the distances between the coils on the vehicle are known. It is then an easy matter to so control the steering servo that the steering of the vehicle is controlled by the radius of curvature of the guide path which is actually then instantaneously traversed by the vehicle. This permits optimum control parameters; the controller can optimally match vehicle operating conditions to the guide path.

In accordance with a feature of the invention, the computed radius of curvature will form a command steering angle which forms part of the overall vehicle control signal. The other control parameters of the vehicle, for example speed (depending on loading, for example) can then either be controlled by the computed signal representative of the radius of curvature, so as to be controlled thereby, or the remaining control parameters may be held constant, which substantially decreases the necessary electronic control circuitry.

The invention will be described by way of example with reference to the accompanying drawings, wherein.

Figure 1:
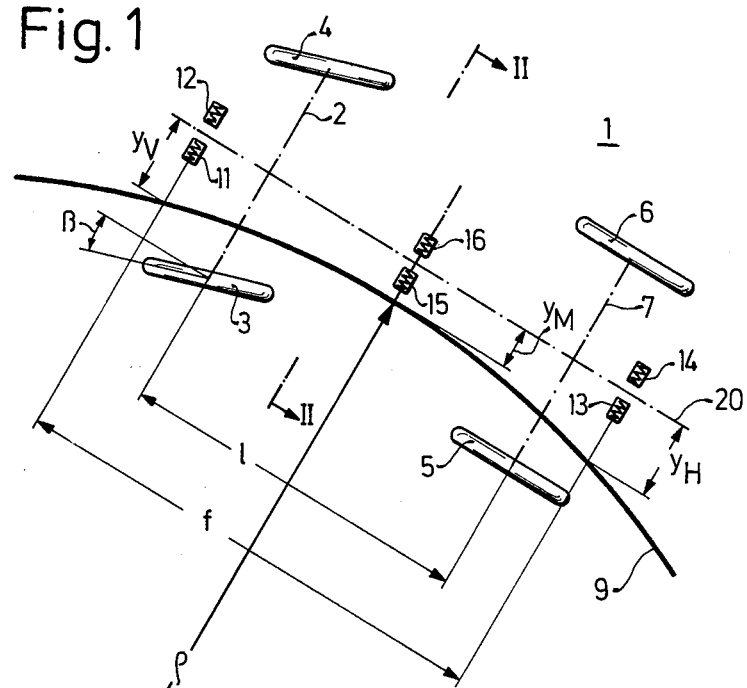
FIG. 1 is a highly schematic side view of a vehicle and the control system, and showing dimensions and symbols used in connection with the explanation of the invention.

Vehicle 1 has a leading or forward axle 2, and a rear or trailing axle 7. Forward wheels 3, 4 are located on the forward axle for steering deflection; the rear wheels 5, 6 are fixedly secured to the rear axle. In the embodiment disclosed, it is assumed that the rear wheels are driven by driving the rear axle 7; it is immaterial, however, whether the rear wheels or the forward, steering wheels are driven.

The guide path is defined by a guide cable 9 (FIGS. 1, 2) buried beneath the surface 8 on which the vehicle is to operate. An alternating current at audio frequency flows through the guide cable 9, generating a magnetic field concentrically therewith, as schematically indicated by broken lines 10 (FIG. 2).

The magnetic field is sensed by sensing coils located on the vehicle, in order to determine the relative instantaneous position of the vehicle with respect to cable 9. Three pairs of sensing coils are located at the underside of the vehicle 1, the forward coil pair 11, 12, the rear coil pair 13, 14 and, in accordance with the present invention, an additional third pair 15, 16, located intermediate the forward and rear coil pairs.

Figure 3:
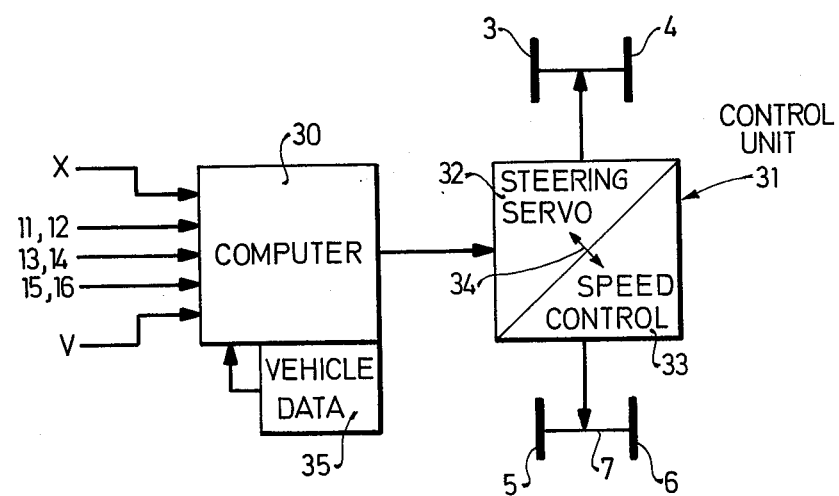
FIG. 3 is a schematic block diagram of the control system in accordance with the present invention.

The voltages induced in the respective coils 11 to 16 due to the magnetic field are connected to suitable conversion circuitry and connected to a computer 30 as schematically shown in FIG. 3. Computer 30 provides output signals to a control unit 31. Control unit 31 includes a steering servo 32 which controls the deflection of the forward steering wheels 3, 4 in such a manner that the distance of the respective coil pairs from the guide path, that is cable 9, becomes a minimum.

Figure 2:
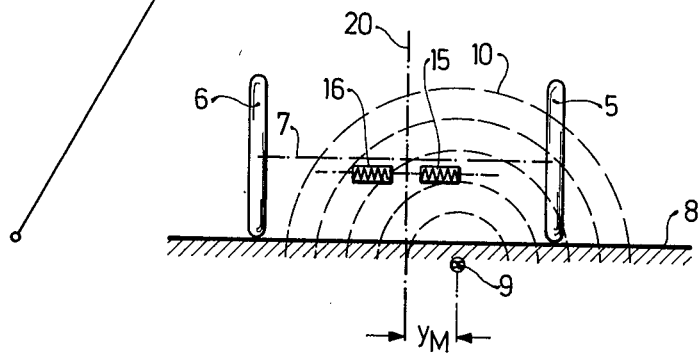
FIG. 2 is a highly schematic cross-sectional view taken along line II—II of FIG. 1.

The invention will best be understood by referring to FIG. 1 and the mathematical considerations on table I, attached to and forming part of this specification. The symbols used in table I are likewise explained thereon.

In addition to the signals from the coils 11-16, computer 30 has an input signal $v$, representative of vehicle speed; additional variable vehicle parameter signals may be introduced at a further input $x$. Fixed vehicle data are derived from an input unit 35 likewise introduced into computer 30. These data may, for example, be unloaded weight of the vehicle, loaded weight of the vehicle, steering characteristics, and the like. The control unit 31 includes the steering servo 32 which controls deflection of the steering wheels, and a speed control unit 33 which controls the speed of the vehicle, as schematically shown by driving axle 7. The speed control may be dependent on the steering deflection angle, as schematically indicated by arrow 34. Therefore, the control unit 31 is shown subdivided only in broken lines. The vehicle speed signal can be obtained either by sensing vehicle speed or by deriving a vehicle speed signal from a speed command controller, for example.

The steering deflection commanded by servo 32 is determined by equation (1). If the third or intermediate pair of coils 15, 16 is exactly intermediate the forward and rear coils, so that the distance between coil pairs 15, 16 and any one of the coil pairs 11, 12 or 13, 14 is $f/2$, then an intermediate signal S, as defined in equation (2) can be obtained. If the position of the coils 15, 16 is different, then the computation becomes somewhat more difficult, but can still be carried out. From equations (1), (2), the radius of curvature can be computed in accordance with equation (3). The radius of curvature then can be used, by use of the relationship of equation (1) to so control the control parameters of control unit 31 that for any operating condition, optimum steering and running will result; these operating conditions include vehicle speed, radius of curvature of the path, and other fixed and variable parameters, such as vehicle loading, length, and the like.

In addition to the parameters of equation (1), a steering angle $\beta_0$ may be commanded which considers the overall system in dependence on radius of curvature of commanded path, vehicle speed and vehicle operating data; the mathematical relationship is set forth in equation (4). Considering equation (4) in equation (1), then the overall control equation (5) will be obtained.

The signals derived from the coil pairs and representative only of deviation of the position of the coils from the guide path are used to control the vehicle to place it above cable 9 of the guide path and to control minor deviations therefrom; the major portion of the command signal, however, will be derived from the signal which commands the steering deflection angle $\beta_0$, in accordance with equation (4). The signals from the three coils and individually evaluated can be averaged or otherwise evaluated.

The guide path through which the vehicle may be guided can have any desired configuration, and particularly may be a sinuous path. The vehicle will follow this guide path with only small deviations from the cable 9. Optimum operating conditions for the respective section of the guide path to be driven over can be determined by the system itself; the speed with which the vehicle will pass over curved sections, particularly, can be adjusted by the vehicle itself by feeding a signal representative of the radius of curvature to the speed control section 33 of control unit 31 to reduce speed if the radius of curvature is small. Use of optimum operating conditions of the vehicle for the respective path being traversed ensures maximum stability of the overall control system and thus reliability of guidance. Additionally, the steering effort as well as wear and tear on steering wheels and the steering system are minimized.

Various changes and modifications may be made within the scope of the inventive concept.

$$\beta + T_1\dot{\beta} + T_2\ddot{\beta} = A(y_v - K_1 y_H - K_2\beta) \quad (1)$$

$$S = y_M \frac{y_V + y_H}{2} \quad (2)$$

$$\rho = \frac{S}{2} + \frac{f^2}{8S} \quad (3)$$

$$\beta_o = \frac{\rho}{1}(1 + v^2 m \frac{\delta_H l_H - \delta'_V l_V}{\delta_V \cdot \delta_H \cdot 1^2}) \quad (4)$$

$$\beta + T_1\dot{\beta} + T_2\ddot{\beta} = A(b \cdot \beta_o + y_V - k_1 y_H - k_2 \beta) \quad (5)$$

$\beta$ steering angle
$\dot{\beta}$ steering angle angular speed
$\ddot{\beta}$ steering angle angular acceleration
$T_1$, $T_2$ time constants
$A, k_1, k_2$ weighting factors
$Y_V$, $Y_H$, $Y_M$ deviation of the respective midpoints of the vehicle from the guide cable
$f$ distance of sensing coil pairs
$v$ vehicle linear speed
$l$ wheel base
$\beta_H$, $\beta'_V$, $l_V$, $l_H$ vehicle parameter data
$m$ weight (mass) of vehicle
$b$ weighting or preference factor assigned to control by radius of curvature of guide path.

We claim:

1. Guidance system for untracked vehicles along a predetermined guide path, defined by guide line means (9) comprising
a steering servo (32) on the vehicle and controlling steering deflection of the steering wheels of the vehicle so that the vehicle will follow the guide path,
sensing means (11-16) located on the vehicle in sensing relation to the guide means, connected to and controlling the steering servo (32) to null deviation of the vehicle from the guide path,
and means to determine the radius of curvature (s) of the path including three sensing means (11, 12; 13, 14; 15, 16) located on the vehicle, by known predetermined distances staggered along the length thereof,
and computing means (30) connected to receive the inputs from said three sensing means, said computing means computing the radius of curvature ($\rho$) of the path as determined by the outputs from the three sensing means representative of the individual respective relative location of any one of the sensing means (11, 12; 13, 14; 15, 16) from the guide line means (9), and providing a steering deflection control signal to the steering servo (32).

2. System according to claim 1, wherein the guide line means comprises a guide cable (9) disposed along the guide path which the vehicle is to follow, said cable being energized with alternating current;
the sensing means (11-16) comprise coils located symmetrically along the longitudinal axis (20) of the vehicle, and said coils include forward coil pairs (11, 12) located in the forward region of the vehicle; rear coils (13, 14) located in the rear region of the vehicle; and a third coil pair (15, 16) located intermediate said forward and rear coil pairs.

3. System according to claim 2, wherein the intermediate, third coil pair (15, 16) is located halfway between the forward and rear coil pairs (11, 12; 13, 14).

4. System according to claim 1, wherein the steering servo (32) is part of the vehicle movement control unit (31) and deflection of the steering wheels, as controlled by the steering servo, is controlled in dependence on parameters additional to the steering deflection control signals representative of the radius of curvature ($\rho$) of the guide path.

5. System according to claim 4, wherein the addtional parameters include deviation of the vehicle from the guide path as sensed by the sensing means.

6. System according to claim 5, wherein a signal representative of the additional parameters is derived, said signal forming a minor portion of the signal controlling the steering servo (32).

7. System according to claim 1, wherein the computation means (30) provides a command steering deflection angle signal to said steering servo (32), said command deflection signal additionally controlling the control unit (31) to control additional vehicle movement parameters controlled by said control unit in dependence on the steering command signal.

8. System according to claim 7, wherein the control unit (31) includes a speed control unit (33) and said additional parameter comprises vehicle speed.

9. System according to claim 1, wherein the computation means (30) provides a command steering deflection angle signal to said steering servo (32), said command deflection signal additionally controlling the control unit (31) to control additional vehicle movement parameters, wherein said additional movement parameters are represented by signals independent of said angular steering deflection angle signal.

10. Method to control steering of an untracked vehicle along a guide line defining a guide path comprising the steps of generating three deviation signals each signal being representative of deviation of a respectively different location on the vehicle from the guide line;

computing the radius of curvature of the path from said three deviation signals;

and commanding steering of the vehicle to follow a path essentially having said computed radius of curvature.

11. Method according to claim 10, further comprising the step of controlling vehicle speed as a function of the computed radius of curvature.

12. Method according to claim 10, further comprising the steps of:

providing control signals representative of operating control parameters;

and controlling the vehicle operating parameters as a function of the computed radius of curvature.

13. Method according to claim 10, further comprising the steps of providing control signals representative of operating control parameters;

controlling operation of the vehicle as a function of said control signals representative of operating control parameters;

and commanding steering of the vehicle to follow said path as a function of computed radius of curvature independently of said control signals representative of operating control parameters.

14. Method according to claim 13, wherein said step of controlling operation of the vehicle as a function of said operating control parameters comprises controlling operation of the vehicle other than steering of the vehicle.

* * * * *